(12) United States Patent
Knott et al.

(10) Patent No.: US 8,708,690 B2
(45) Date of Patent: Apr. 29, 2014

(54) APPARATUS FOR THE EXPANSION OF CONTAINERS

(75) Inventors: Josef Knott, Walkenstetten/Schierling (DE); Eduard Handschuh, Regensburg (DE)

(73) Assignee: Krones AG, Neutraubling (DE)

( * ) Notice: Subject to any disclaimer, the term of this patent is extended or adjusted under 35 U.S.C. 154(b) by 186 days.

(21) Appl. No.: 13/347,070

(22) Filed: Jan. 10, 2012

(65) Prior Publication Data

US 2012/0177770 A1    Jul. 12, 2012

(30) Foreign Application Priority Data

Jan. 10, 2011 (DE) .......................... 10 2011 008 173

(51) Int. Cl.
*B29C 49/58* (2006.01)

(52) U.S. Cl.
USPC ............... 425/535; 92/99; 251/63.4; 251/331

(58) Field of Classification Search
USPC .................. 425/535; 251/63.4, 331; 92/99
See application file for complete search history.

(56) References Cited

U.S. PATENT DOCUMENTS

| | | | | |
|---|---|---|---|---|
| 3,399,695 A | * | 9/1968 | Stehlin | 137/551 |
| 3,610,570 A | * | 10/1971 | Erwin, Jr. | 251/63.4 |
| 3,726,325 A | * | 4/1973 | Munz | 141/317 |
| 3,874,630 A | * | 4/1975 | Novey | 251/68 |
| 3,923,282 A | * | 12/1975 | Henzler | 251/63.4 |
| 4,166,606 A | * | 9/1979 | Kawolics et al. | 251/214 |
| 5,941,505 A | * | 8/1999 | Nagel | 251/335.2 |
| 6,298,638 B1 | * | 10/2001 | Bettle | 53/452 |
| 6,394,417 B1 | | 5/2002 | Browne et al. | |
| 6,685,164 B1 | * | 2/2004 | Koizumi et al. | 251/331 |
| 6,695,280 B2 | * | 2/2004 | Litzenberg et al. | 251/63.5 |
| 7,651,066 B2 | | 1/2010 | Vogel et al. | |
| 2003/0019353 A1 | | 1/2003 | Vogel et al. | |
| 2006/0145107 A1 | | 7/2006 | Masamura et al. | |

FOREIGN PATENT DOCUMENTS

| | | |
|---|---|---|
| EP | 1271029 | 1/2003 |
| JP | 9-257152 | 9/1997 |
| WO | 02099324 | 12/2002 |
| WO | 2005036039 | 4/2005 |
| WO | 2011042184 | 4/2011 |

OTHER PUBLICATIONS

German Search Report issued on Apr. 20, 2012 in corresponding European Patent Application 12150567.1.

* cited by examiner

*Primary Examiner* — Robert B Davis
(74) *Attorney, Agent, or Firm* — Onello & Mello, LLP

(57) ABSTRACT

A blow valve comprises at least one blow valve body, an environmentally controlled first receiving space constructed in the blow valve body and having at least one entry opening and at least one exit opening for receiving and conveying an operating gas, and a second receiving space constructed in the blow valve body for the guidance of a pressure distribution member such as, for example, a piston element. A sealing component prevents exchange of gas between the first receiving space and the second receiving space and is arranged between the first and second receiving spaces. The sealing component has a stationary part for fixing to the blow valve body and a movable part for changing the flow rate of the operating gas, wherein the setting member is surrounded in part by the sealing component and is coupled to the movable portion in order to move it.

19 Claims, 5 Drawing Sheets

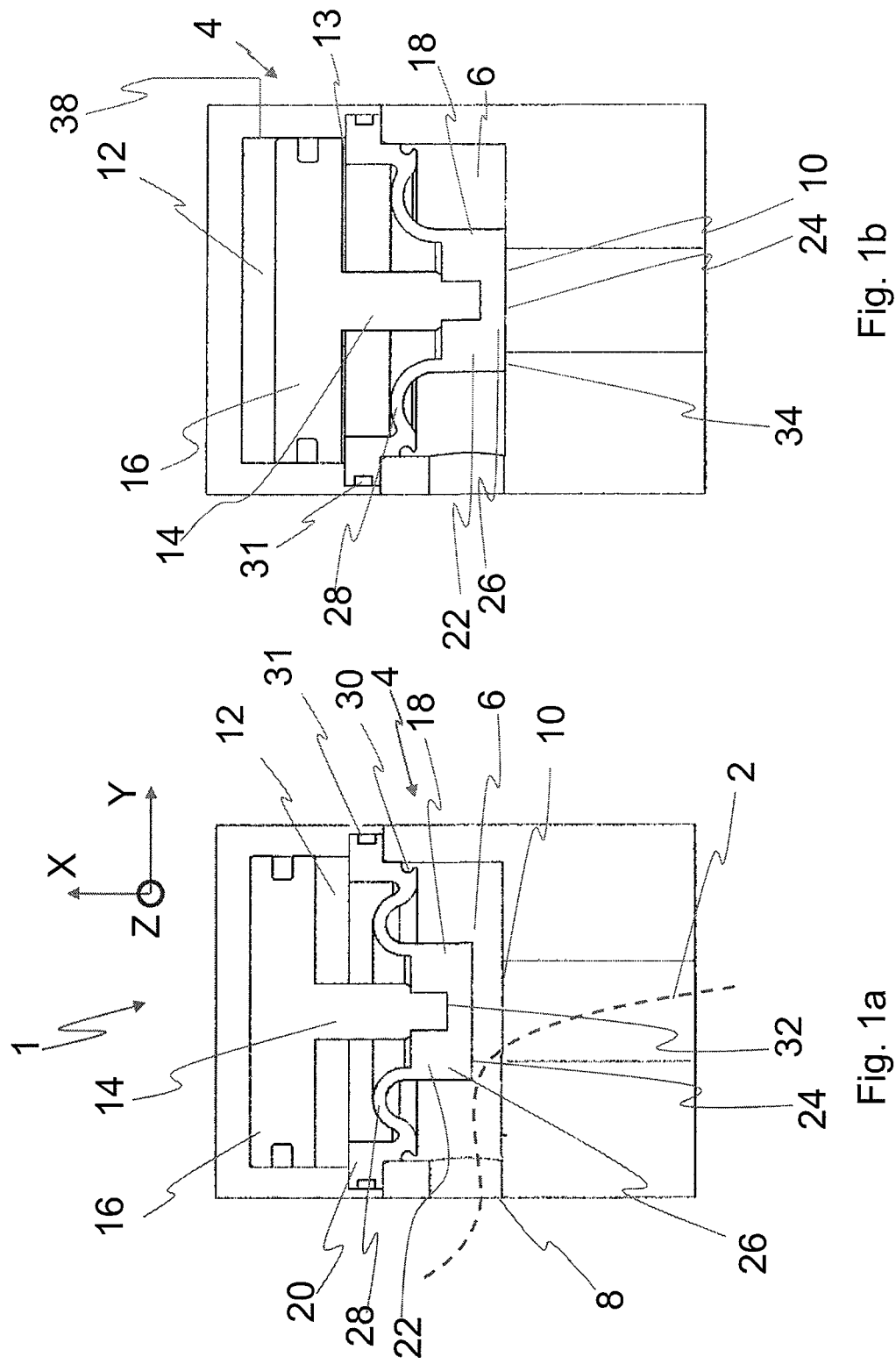

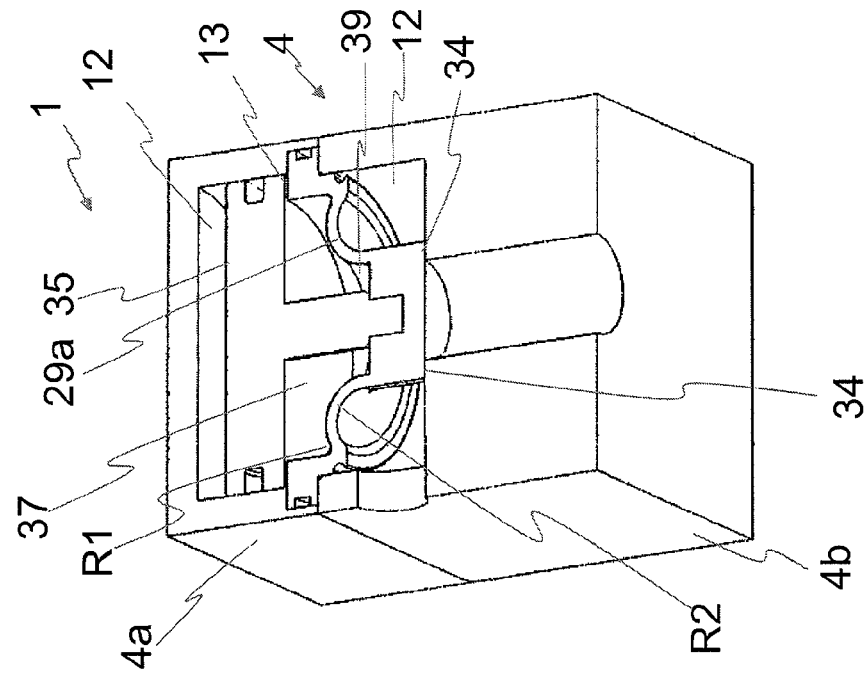
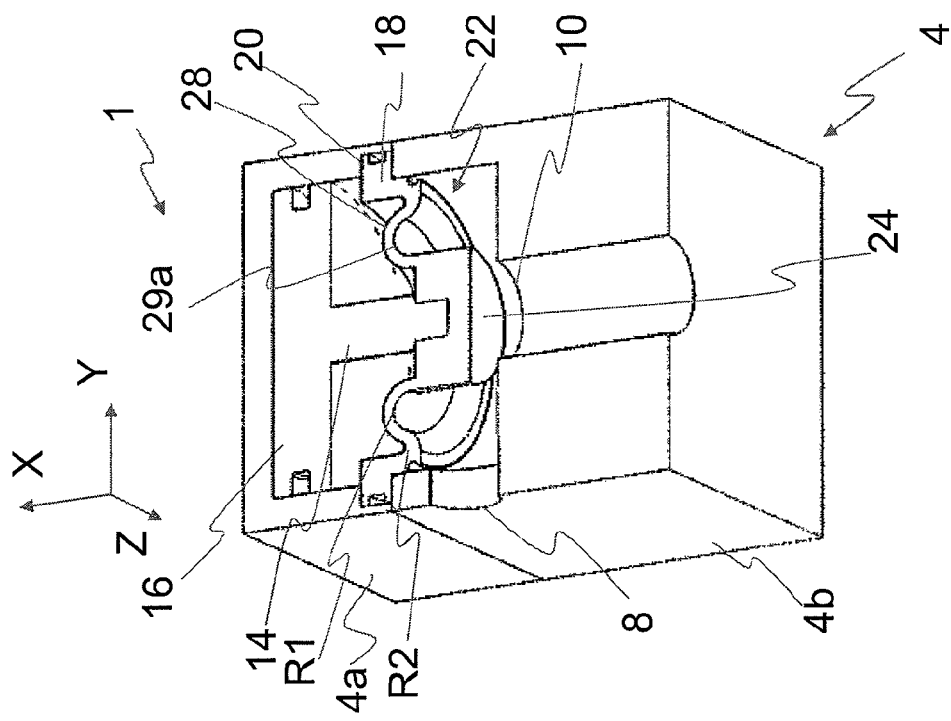
Fig. 2a
Fig. 2b

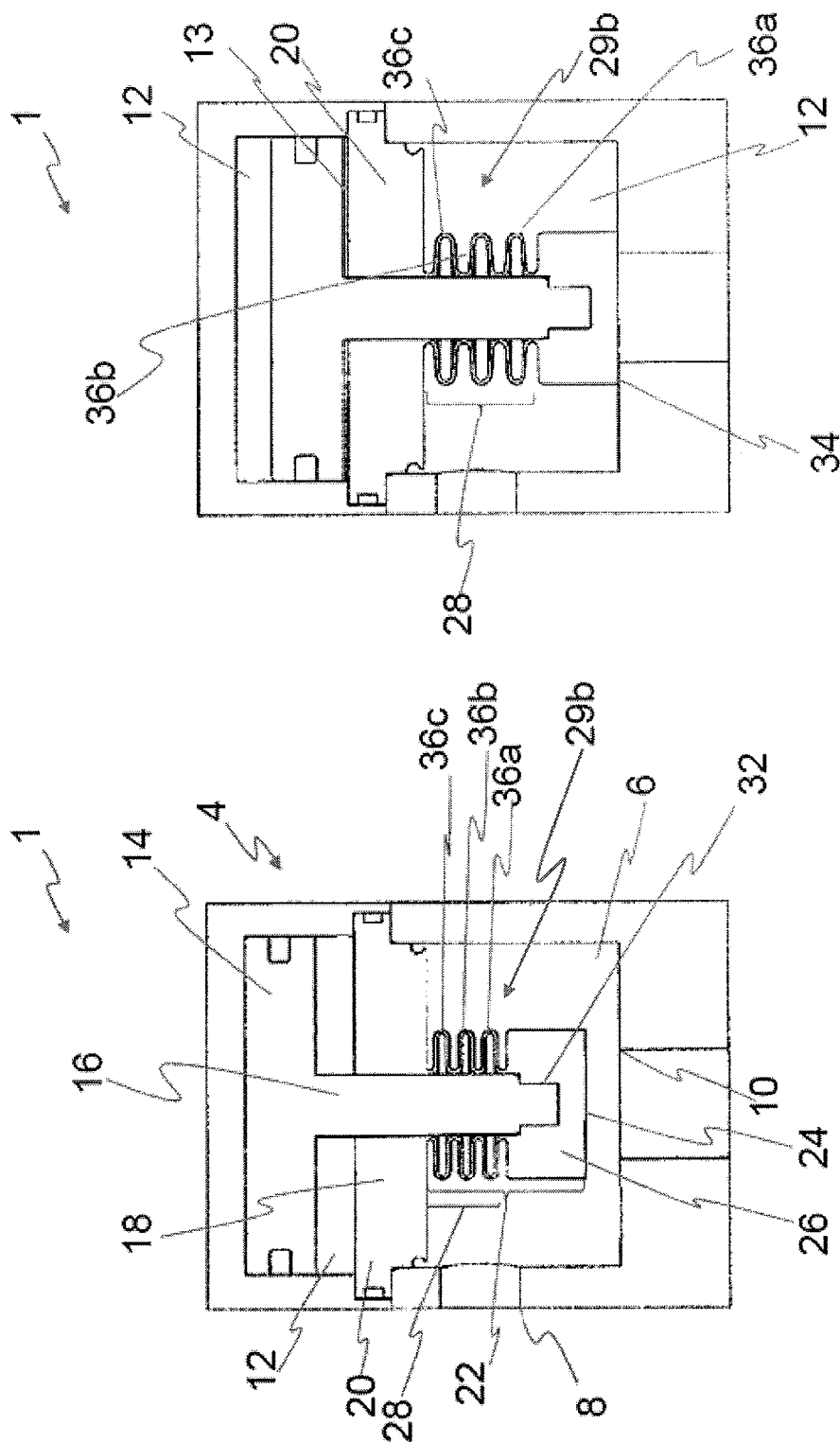

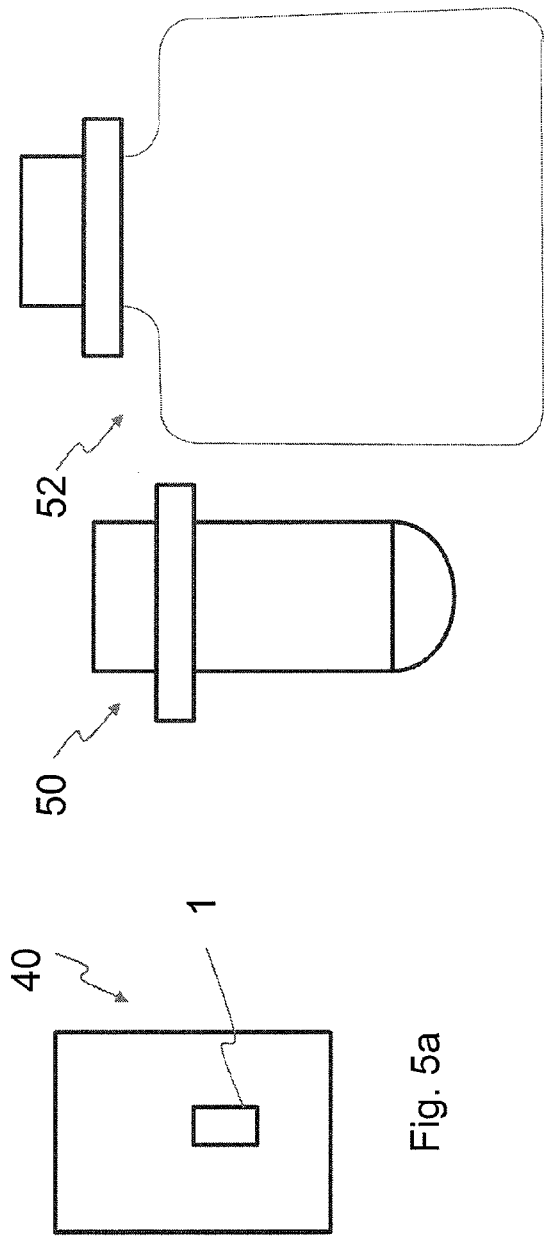
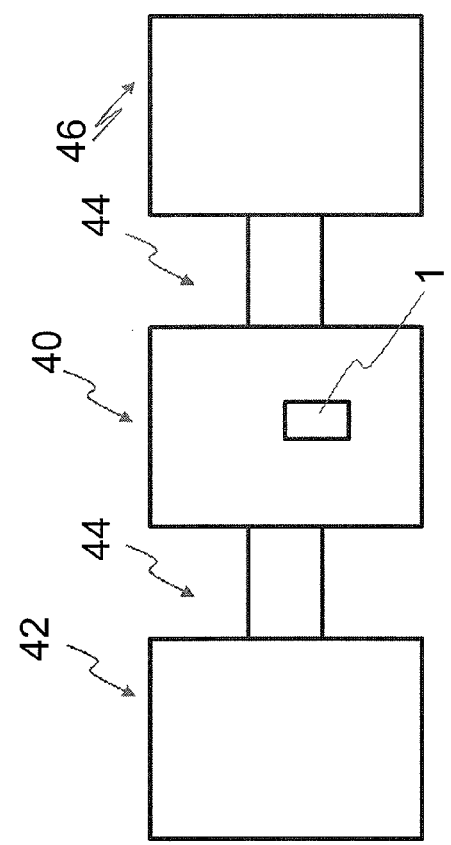

APPARATUS FOR THE EXPANSION OF CONTAINERS

RELATED APPLICATIONS

This application claims priority to German Patent Application No. 10 2011 008 173.9, filed on Jan. 10, 2011, in the German Patent and Trademark Office, the content of which is incorporated herein by reference in its entirety.

TECHNICAL FIELD

The present inventive concepts generally relate to apparatus for the expansion of plastics material containers including, in particular, a blow valve for blow moulding machines, and a blow moulding machine with a blow valve.

BACKGROUND

Blow valves are heavily loaded structural parts, the components of which are under high pressures and are subjected to rapid changes of direction and thus sharp accelerations. Blow valves are used or employed in blow moulding machines, in particular in blow moulding machines for shaping pre-forms into containers including bottles. In the sector of the foodstuffs industry and also in further sectors of industry it is necessary for the containers to be handled and produced in a germ-free manner. The shaping is preferably carried out by the supply of a pressurized fluid into the inner space of the pre-form, which in a particularly preferred manner is situated in a blow mould and which is expanded as far as the constricted shape of the blow mould on account of the fluid which is under pressure. In order to prevent a complicated cleaning of the shaped containers, considerable demands are set upon the cleanness of the pressurized fluid.

A valve for use in a blow moulding machine is known from the European Patent Office publication No. EP 1 271 029 A1. The valve known from EP 1 271 029 A1 has a movable piston, on one end of which is provided a sealing device for sealing off an opening in a housing through which a gas used for the shaping of the pre-form is conveyed. During an opening and closing movement the piston moves relative to a wall part and with this wall part it forms a slot which is sealed off by a sealing ring. In this case the use of a sealing ring is a major drawback since as a result of the relative movement of the piston and the wall a constant loading of the sealing ring occurs, on account of which the latter drops sharply in its functionality, i.e. in its sealing effect. In addition, even at low speeds of the piston there is no absolute guarantee that no impurities will penetrate into the sterile area, since the piston slides beyond the seal from the non-cleaned or non-sterile rear space into the cleaned or sterile valve space or control space and thus contaminates the latter.

SUMMARY

An embodiment of present inventive concepts provides a blow valve and a blow mould machine including the blow valve, which despite a high switching frequency and high operating pressures can continuously allow the substantial prevention of contamination of an environmentally controlled area, including an aseptic area, as a consequence of a movement of a pressure distribution member (e.g., a piston head).

In an embodiment of present inventive concepts, a blow valve for changing a flow rate of an operating gas in an operating gas communication path is provided. In this case the blow valve includes at least one blow valve body which is preferably constructed in a plurality of parts, an environmentally controlled receiving space constructed in the blow valve body and having at least one entry opening and at least one exit opening for receiving and conveying an operating gas and a second receiving space constructed in the blow valve body for the guidance of a pressure distribution member.

In an embodiment of present inventive concepts, a sealing component which completely prevents an exchange of gas between the first receiving space and the second receiving space is arranged between the first receiving space and the second receiving space, the sealing component having a stationary part fixed to the main body of the blow valve and a movable part for changing the flow rate of the operation gas, the pressure distribution member being surrounded in part by the sealing component and being coupled to the movable part or portion in order to move it.

This is advantageous since it is not necessary for a slot between structural parts moving relative to each other to be sealed off by means of a sealing ring, and so a complete encapsulation of a sterile first receiving space from a non-sterile second receiving space is provided. The sealing effect is carried out in particular by two components which do not move with respect to each other, i.e. the stationary or fixed part of the seal, and preferably a corresponding area of the housing. In addition, an embodiment provides for a very long service life of the blow valve, e.g. approximately 10 million blowing cycles, to be possible per blowing procedure in the case of two strokes.

In this manner, a pressure distribution member can be understood as being any device which permits a movement of the seal or seal component. A device of this type can be attached locally or completely inside and/or outside the valve body and can form a drive or can be connected to a drive respectively.

In an embodiment, the stroke height, i.e. the path which is covered at most by the piston element or the pressure distribution member respectively, is between 2 mm and 20 mm and preferably between 3 mm and 10 mm and, in a particularly preferred manner, between 4 mm and 6 mm, in particular precisely 5 mm. In an embodiment, the entry and/or exit opening preferably has or have a diameter of between 10 mm and 50 mm, preferably between 12 mm and 30 mm and, in a particularly preferred manner, between 14 mm and 18 mm, and in particular precisely 16 mm.

In an embodiment, the pressure distribution member is preferably a piston element which is displaceable on a preferably linear path of movement as a consequence of changes in pressure. It is possible, in an embodiment, for the first receiving space and/or the second receiving space to be made cylindrical or cuboidal, in which case it can likewise have spherical, including, for example, ball-shaped portions.

In accordance with a further preferred embodiment of present inventive concepts, in order to close the at least one opening, e.g. an inlet opening and/or an outlet opening or an inlet bore and/or an outlet bore, the movable portion which forms a closure face or on which a closure face or a closure area is formed, is capable of being brought into contact with the opening.

The diameter of the operative face of the piston element or the pressure distribution member respectively is preferably between 10 mm and 100 mm, preferably between 30 mm and 70 mm and, in a particularly preferred manner, between 45 mm and 55 mm. In an embodiment, the diameter of the operative face is approximately 50 mm or, in an embodiment, precisely 50 mm. In an embodiment, the diameter of the closure face is preferably between 5 mm and 50 mm, preferably between 15 mm and 30 mm and, in a particularly preferred manner, between 20 mm and 24 mm, and in particular the diameter of the closure face is substantially 22 mm or precisely 22 mm.

This embodiment is advantageous since depending upon the distance of the movable portion from the opening the flow rate is capable of being changed, e.g. changes can preferably be made in a continuous manner or in steps between a closed setting and a completely opened setting, in which case it is also possible for changes only to be capable of being made in a precise manner between an opened setting and the closed setting. In an embodiment, the opening and the movable portion can have one or more contact areas for sealing, it being preferable for precisely one contact area between the movable portion and the opening to be formed in the closed setting. In an embodiment, the contact area can be made linear and/or planar. It is preferable for the closure face or a closure edge and the opening to be formed in a manner corresponding to each other. In an embodiment, it is possible for the opening to be made flat, conical, spherical, in particular curved, etc. or combinations of these shapes.

In accordance with a further preferred embodiment of the present inventive concepts, the closure face is formed on a first part of the movable portion which in a particularly preferred manner is arranged fixed on or opposite the pressure distribution member, in particular on the piston element.

This embodiment is advantageous since no relative movement occurs between the first part of the movable portion and the pressure distribution member or the piston element respectively. A highly precise and wear-free actuation or opening and closing movement is thus capable of being carried out.

In accordance with a further preferred embodiment of the present inventive concepts, a second movable part of the movable portion which is movable with respect to the piston element is formed between the first part of the movable portion and the stationary part of the sealing component.

This embodiment is advantageous since it permits a relative movement of the first part of the movable portion in synchronism with the piston with respect to the housing and/or the stationary part of the sealing component.

It is preferable for the sealing component projecting into the first and/or the second receiving space, e.g. the part of the sealing component extending between the boundary walls formed in the longitudinal direction of the piston and in the movement direction of the pressure distribution member respectively, to be overlain completely by the pressure distribution member or the piston head respectively, and in a particularly preferred manner a gas, in particular air, or a vacuum is exclusively present between the overlain part of the sealing component and the piston element. In addition, it is possible for the shape of the piston head or the pressure distribution member respectively and the shape of the second part of the movable portion preferably to differ from each other. The second part of the movable portion preferably joins, in particular in an integral manner, the first part of the movable portion to the stationary part.

In accordance with a further preferred embodiment of the present inventive concepts, the second movable part is designed in the manner of a bellows, including in that of, for example, a meander shape, and/or in the manner of a diaphragm. This embodiment is advantageous since different displacement paths are possible, without the sealing effect or the stationary part of the sealing component being influenced. Depending upon the opening setting a greater quantity of fluid, in particular gas, can flow through the blow valve. In order to permit a maximum through-flow, the maximum fluid communication path formed between the closure face and the opening to be closed preferably corresponds in its diameter or its opening area respectively to the diameter or the opening area respectively of the smallest opening.

In the context named above, "in the manner of a bellows" is preferably understood as being at least one fold forming a bend, in particular folds forming 2, 3, 4, 5, 6, 7, 8 or more bends, and preferably a plurality of bends arranged one behind the other or one below the other and connected to one another. It is preferable for the bellows to extend in the movement direction of the pressure distribution member, e.g. the bends are preferably arranged one behind the other or one below the other or one above the other respectively in the direction of movement of the pressure distribution member or in the direction of movement of the piston element respectively.

In an embodiment, "in the manner of a diaphragm" describes a design of the sealing component in which preferably at no time and, in a particularly preferred manner, in the closed position are no wall portions or portions of the body of the sealing component overlain in the direction of movement of the pressure distribution member. In an embodiment, the entire sealing component is designed in the manner of a diaphragm.

In accordance with a further preferred embodiment of the present inventive concepts, the closure face is movable with the pressure distribution member in the direction of the opening to be closed, and in this way the closure movement is capable of being carried out by a drive which is preferably formed by a piston element which is movable with a working gas, in particular at a pressure of from 5 bar to 20 bar.

This embodiment is advantageous since a relatively low pressure is sufficient to cause a change of the operation gas communication path, in particular a closure of the operation gas communication path. This embodiment allows a saving of energy in an advantageous manner, since a preparation of a working gas at a far higher pressure is avoided.

In an embodiment, the piston element preferably has an operative face with which it bounds the second receiving space on one side and with which the operation fluid can cooperate. In an embodiment, the area of the operative face preferably corresponds to double the area of the closure face and, in a particularly preferred manner, is larger than double the area of the closure face, and in particular is more than three times, four times or five times as large as the closure face.

In various embodiments, the drive is operated with a magnetic, electrical, electromagnetic, mechanical or hydraulic pressure distribution member and/or a pressure distribution member combined therefrom. The pressure distribution member can therefore be connected directly to the drive and can thus form the latter, in particular in the form of a pneumatic drive, or on the other hand can co-operate indirectly with the latter, in particular in the form of an electromagnetic drive, as a result of which it is preferably also possible to consider the drive to be a separate drive.

In accordance with a further preferred embodiment of the present inventive concepts, the operation fluid is clean air and/or compressed air, e.g. preferably sterile air, at a pressure of from 21 bar to 60 bar, preferably from 30 bar to 50 bar and, in a particularly preferred manner, of approximately 40 bar or precisely 40 bar.

The connecting movement of the valve, i.e. the opening movement of the valve or the distancing of the closure face from the opening respectively, is therefore capable of being carried out for example by a pressure cushion or the pressure in the first receiving space respectively. In an embodiment, it is preferable for the pressure to be greater in the first receiving space at least for a time than in the second receiving space, as a result of which a return of the closure face or the pressure distribution member respectively and preferably the piston element is possible in an automatic manner. In an embodiment, the ratio of the force—acting upon the closure face—and the closure face in order to return the closure face to an opened position or a further opened position to be greater for a time than the ratio of the force—acting upon the operative face—and the operative face.

This embodiment is advantageous since the fluid used for shaping the pre-form or the pre-forms is capable of being used in order to produce a return movement of the pressure distribution member or the piston element respectively to an opened position or a further opened position. This means that significant additional energy is unnecessary in order to transfer the pressure distribution member or the piston element respectively to the opened state. It is particularly preferred for the pre-forms to be plastics material pre-forms, in particular of PET.

In accordance with an embodiment of the present inventive concepts, the sealing component includes, at least in part, a material selected from the group including metal, elastomers, for example rubber or plastics material, for example Teflon, similar materials and/or combinations thereof.

In this way, the sealing component preferably constitutes a flexible element or an element flexible at least in part. This element can be designed in the form of a bellows of, for example, Teflon or a diaphragm of, for example, Teflon respectively, and is likewise possible to consist of a combination of these materials.

This embodiment is advantageous since, particularly when using a multiplicity of materials, the materials can be used in a manner optimized according to their properties.

In addition, embodiments of present inventive concepts relate to a blow moulding machine for shaping plastics material pre-forms into containers, including, for example, bottles, which includes at least one blow valve such as according to various embodiments described herein.

In this way, according to embodiments of inventive concepts, it is likewise proposed that use should be made in an hygienically optimized machine of a blowing air valve in which the sterile valve space or control space respectively is separate from the non-cleaned valve space. This is achieved in particular by the use of a flexible element, namely the sealing component.

Embodiments of present inventive concepts relate to a filling assembly which preferably includes at least one heating device for heating plastics material pre-forms, a blow moulding machine according to various embodiments described herein, arranged downstream of the heating device in the conveying direction, and a filling apparatus arranged downstream of the blow moulding machine in the conveying direction in order to fill the containers. In an embodiment, a sterilization process uses H2O2, peracetic acid or the like to take place in the assembly. In an embodiment, the operating temperature of the assembly and, in particular, of the blow valve is preferably 20° C. and the switching time of the blow valve is preferably between 5 ms and 90 ms, preferably between 15 ms and 60 ms and, in a particularly preferred manner, between 25 ms and 35 ms, and in particular the switching time amounts to approximately or precisely 30 ms.

In an aspect of inventive concepts, a blow valve is provided for changing a flow rate of an operating working gas in a gas communication path, the blow valve including a blow valve body, an environmentally controlled first receiving space constructed and arranged in the blow valve body and having at least one entry opening and at least one exit opening for receiving and conveying gas, a second receiving space constructed and arranged in the blow valve body and arranged for guiding a pressure distribution member, and a sealing component configured to substantially prevent an exchange of gas between the first receiving space and the second receiving space, the sealing component arranged between the first receiving space and the second receiving space. The sealing component has a stationary portion that is fixed to the blow valve body and a movable portion arranged for changing the flow rate of gas, wherein the pressure distribution member is at least partially surrounded by the sealing component and is coupled to the movable portion so that the movable portion and the pressure distribution member move together.

In an embodiment, the pressure distribution member is a piston head.

In an embodiment, the movable portion forms a closure face capable of being brought into contact with at least one of the exit opening and entry opening so as to close the at least one of the exit opening and entry opening.

In an embodiment, the closure face is formed on a first portion of the movable portion and is fixed to the pressure distribution member.

In an embodiment, the pressure distribution member comprises an operative face bordering the second receiving space, wherein the operative face has an area of at least about twice that of the closure face.

In an embodiment, the pressure distribution member is a piston head and a second portion of the movable portion is movable with respect to the piston head and is formed between the first portion of the movable portion and the stationary portion of the sealing component.

In an embodiment, the second movable portion is designed in the manner of a bellows.

In an embodiment, the second movable portion comprises a meander shape.

In an embodiment, the second movable portion is designed in the manner of a diaphragm.

In an embodiment, the piston head is movable with a working gas pressure. In an embodiment, the piston head is movable with an working gas pressure of at least between about 5 bar to 20 bar. In an embodiment, the operating working gas is clean air at a pressure of between about 20 bar to 60 bar.

In an embodiment, at least a portion of the sealing component includes a material selected from the group consisting of metal, rubber, and plastics material. In an embodiment, at least a portion of the sealing component comprises Teflon.

In an embodiment, the environmentally controlled first receiving space is aseptic.

In an aspect of inventive concepts, a blow moulding machine for shaping plastics material pre-forms into containers is provided, the blow machine including a blow valve according to the embodiments described herein.

In an embodiment, the blow moulding machine and blow valve are arranged and configured to mold bottles.

In an aspect of inventive concepts, a filling assembly for filling containers is provided, the filling assembly including a heating device for heating plastics material pre-forms, and a blow moulding machine according to embodiments described herein. The blow molding machine is arranged downstream of the heating device in the conveying direction and a filling apparatus is arranged downstream of the blow moulding machine in the conveying direction.

Further advantages, aims and properties of present inventive concepts are explained with reference to the following description of accompanying drawings, including blow valves for changing an operation gas communication paths that are illustrated by way of example. Structural parts of the blow valves which correspond at least substantially with respect to their function in the figures can be designated with the same references in this case, it being unnecessary for these structural parts to be numbered or explained in all the figures.

BRIEF DESCRIPTION OF THE DRAWINGS

The drawings are not necessarily to scale, emphasis instead being placed upon illustrating the principles of the inventive concept in the drawings.

FIG. 1a is a two-dimensional illustration of a blow valve in an opened state according to an embodiment of inventive concepts.

FIG. 1b is a two-dimensional illustration of a blow valve in a closed state according to an embodiment of inventive concepts.

FIG. 2a is a three-dimensional illustration of a blow valve in an opened state according to an embodiment of inventive concepts.

FIG. 2b is a three-dimensional illustration of a blow valve in a closed state according to an embodiment of inventive concepts.

FIG. 3a is a two-dimensional illustration of a blow valve in an opened state according to an embodiment of inventive concepts.

FIG. 3b is a two-dimensional illustration of a blow valve in a closed state according to an embodiment of inventive concepts.

FIG. 5a is a diagrammatic illustration of a blow moulding machine with a blow valve according to an embodiment of inventive concepts.

FIG. 5b is a diagrammatic illustration of a container before and after the shaping according an embodiment of inventive concepts.

FIG. 5c is a diagrammatic illustration of an assembly for the shaping of containers according to an embodiment of inventive concepts.

DETAILED DESCRIPTION

Figure 4A:
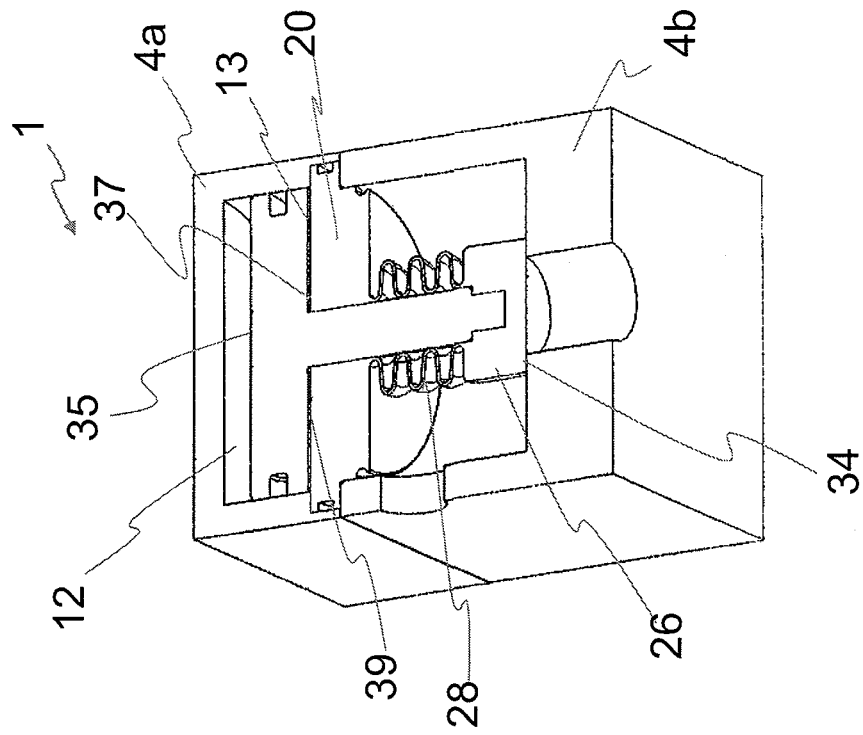
FIG. 4a is a three-dimensional illustration of a blow valve in an opened state according to an embodiment of inventive concepts.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application. It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

FIG. 1a is a two-dimensional illustration of a blow valve in an opened state according to an embodiment of inventive concepts. The blow valve 1 is used for changing an operation gas communication path 2 which extends through an entry opening 8, a first receiving space 6 and an exit opening 10 of the blow valve housing 4. In an embodiment, the entry opening 8 and the exit opening 10 can be changed over and/or formed on the same wall or the same wall area respectively. In an embodiment, a plurality of entry and/or exit openings 8, 10 are used, in which case the entry and/or exit openings 8 and/or 10 are preferably bores. A second receiving space 12 is formed in the blow valve housing 4 at a distance from the first receiving space 6 in the "X" direction. In addition, it is possible for one or more entry and/or exit openings 8 and/or 10 to be capable of being closed by a closure device (not shown).

In FIG. 1a the blow valve 1 is in an opened state, and is conveying a gas through the first receiving space 6 in accordance with the fluid communication path 2.

The first and second receiving spaces 6 and 12 are preferably separated from each other or encapsulated by a sealing component 18 and, in an embodiment, the sealing component 18 consists of precisely one part. In an embodiment, the sealing component 18 includes an element which is flexible at least in part and which is preferably designed in such a way that on one side it is clamped in a fixed manner, with a static sealing point sealed off with respect to the rear space, and on the other sides it can seal off an inlet or outlet bore with the flexible part of the element.

A pressure distribution member 14, in particular a piston element 16, is arranged in the second receiving space 12. In a particularly preferred manner the piston element 16 is movable, in particular displaceable, in the "X" direction, e.g. the piston element 16 is mounted in a sliding manner. The piston element 16 has a first and a second region and, in an embodiment, the first region is considered to be a lower region and the second region is considered to be an upper region. The upper region is preferably at a greater distance from the first receiving space 6 than the lower region and it preferably has a surface extending substantially, and in a particularly preferred manner precisely, in the Y/Z plane. The lower region likewise preferably has a surface extending substantially, and in a particularly preferred manner precisely, in the Y/Z plane, the surface of the upper region preferably being larger, and in a particularly preferred manner larger by a multiple, than the surface of the lower region. In an embodiment, the space situated between the upper part of the piston element 16 and the sealing component 18 is without pressure for at least part of the time, and in particular permanently without pressure, e.g. a lower pressure is preferably present in the space between the sealing means 18 and the piston element 16 than in the first receiving space 6 and/or in the remaining receiving space 12, e.g. above the upper region of the piston element 16 in the "X" direction.

The lower region of the piston element 16 is preferably connected to the sealing component 18 in a coupling region 32. The sealing component 18 preferably has a part 20 which is stationary with respect to the valve housing and which is coupled, and in particular connected in a fixed manner, to the wall of the blow valve body 4 or housing respectively. In this case it is possible for the stationary part 20 of the sealing means 18 to be connected to the blow valve body 4 in a friction-locking, positively locking and/or a material-to-material bonded manner. It is preferable for the sealing component 18 to be connected in a releasable manner to the blow valve body 4, in which case a non-releasable connection is also conceivable. It is preferable for a movable part 22, which is preferably displaceable at least locally in the "X" direction, to extend as a continuation of the stationary part 20 at a distance in the Y direction, i.e. projecting into the interior of the blow valve body 4. A closure face 24 for closing an entry and/or exit opening 8, 10, in particular the exit opening 10, is provided on the movable part 22. In this case the movable part can be made flexible and/or stretchable.

In an embodiment, the movable part 22 is capable of being divided functionally into a first and a second part 26 and 28. The first part 26 of the movable part 22 is coupled to the piston element 16 and is therefore not moved with respect to the latter. The second part 28 of the movable part 22 preferably connects the first part 26 of the movable part 22 to the stationary part 20. The second part 28 is preferably made flexible or resilient and is displaceable at least in part in the "X" direction. In addition, a deformation of the second part 28, which in the embodiment shown in FIG. 1a is preferably made corrugated, in particular wave-shaped, takes place during a displacement movement of the piston element 16.

In addition, the sealing means 18 preferably has two continuous notches 30, 31, the first notch 30 being formed in the region of the second part 28 of the movable part 22 and the second notch 31 in the region of the stationary part 20 of the sealing means 18. The first and/or second notch 30, 31 can have curved and/or straight boundary regions, the first notch 30 preferably having a basic curved form and the second notch 31 preferably having a basic straight or rectangular form.

In FIG. 1b the blow valve 1 shown in FIG. 1a is shown in a second state, namely a closed state. In this state a pressure is present above the upper region of the piston element 16 as a result of the supply of a working gas, as a result of which a displacement of the piston element 16 from the setting shown in FIG. 1a into the setting shown in FIG. 1b has been made possible on the one hand and which makes possible a temporary and/or permanent closure of the exit opening by pressing the closure face 24 against a closure contact area 34 on the other hand. The reference number 38 designates a gas line connection by way of which a working gas for moving the piston element 16 is capable of being supplied to the second receiving space 12.

In FIG. 2a the embodiment shown in FIG. 1a is shown in a three-dimensional illustration. It is evident from this illustration that the pressure distribution member 14 or the piston element 16 respectively, the closure face 24, the sealing means 18 and the entry and exit openings 8, 10 can be made round or cylindrical. It is likewise conceivable, however, for individual components or all the components named above to be able to form a shape deviating from a round or cylindrical shape, in particular a shape with straight or rectangular portions.

In addition, it is evident from FIG. 2a that the blow valve body 4 can be constructed in a multiplicity of parts and, in an embodiment, in two parts. In an embodiment, the reference identifier 4a designates a first part of the blow valve body 4 and the reference identifier 4b preferably designates a second part of the blow valve body 4. In an embodiment, portion of the sealing component 18 is arranged between wall parts of the first and second parts 4a, 4b of the blow valve body 4 which extend in particular in the "X" direction. In an embodiment, the portion of the sealing component 18 arranged between the first and second parts 4a, 4b is fixedly clamped, glued, and/or vulcanized between the wall parts.

The wave-shaped region 29a of the second part 28 of the movable part 22 preferably has a first curved portion, which preferably adjoins the stationary part 20, with a first radius R1 and a second curved portion, which preferably adjoins the first part 26 of the movable part 22, with a second radius R2. The radii R1 and R2 can be substantially the same, or different from each other. In an embodiment, the radius R1 is greater than the radius R2 and, in an embodiment, to be greater by multiple times the radius R2.

A three-dimensional view of the embodiment shown in FIG. 1b is illustrated in a closed state in FIG. 2b. It is evident from FIG. 2b that the radii R1 and R2 of the curve-shaped region 29a have changed, in particular have widened, as a consequence of the displacement of the piston element 16. In an embodiment, the reference identification number 13 designates a "dead zone", i.e. a zone into which the piston element 16 is not displaceable. The region between the underside 37 of the pressure distribution member 14 or the piston element 16 respectively and the top side of the sealing component 18 is preferably without pressure or, in a particularly preferred manner, does not undergo any substantial changes in pressure.

A two-dimensional illustration of a second embodiment of the present invention in a first state, in particular in an opened state, is shown in FIG. 3a. The stationary part 20 of the sealing component 18 preferably extends substantially parallel and, in a particularly preferred manner, completely parallel to the Y/Z plane and substantially completely from the lateral wall of the blow valve body 4 into the centre of the blow valve body 4. In the region of the centre of the blow valve body 4 or in another region in which the pressure distribution member is surrounded at least locally by the sealing component 18, the pressure distribution member 14 is movable with respect to the sealing component 18. The stationary part 20 is preferably adjoined by the movable part 22 which preferably extends in the "X" direction.

The movable part 22 likewise has, as in the first embodiment shown in FIGS. 1a to 2b, a first part 26 and a second part 28. The first part 26 is likewise connected to the pressure distribution member 14 or the piston element 16 respectively in the coupling region designated by the reference number 32. The second part 28 of the movable part 22 in turn connects the first part 26 of the movable part 22 to the stationary part 20.

It is evident from FIG. 3a that the second part 28 of the movable part 22 is designed in the form of a bellows-like region 29b. The bellows-like region 29b is characterized by bends or folds 36a to 36c, the bellows-like region 29b having any desired number of bends or folds 36a to 36c, in particular precisely 1, 2, 3, 4, 5, 6, 7, 8 or 9 bends or folds 36a to 36c. The bends 36a to 36c are preferably compressed or in a neutral setting in the opened arrangement.

In FIG. 3b the embodiment shown in FIG. 3a is shown in a closed state. The bends 36a to 36c are preferably tensile stressed or relaxed in part respectively or in a neutral setting. Different stroke paths of the piston element 16 are capable of being carried out or set, depending upon the number and shape of the bends 36a to 36c.

Figure 4B:
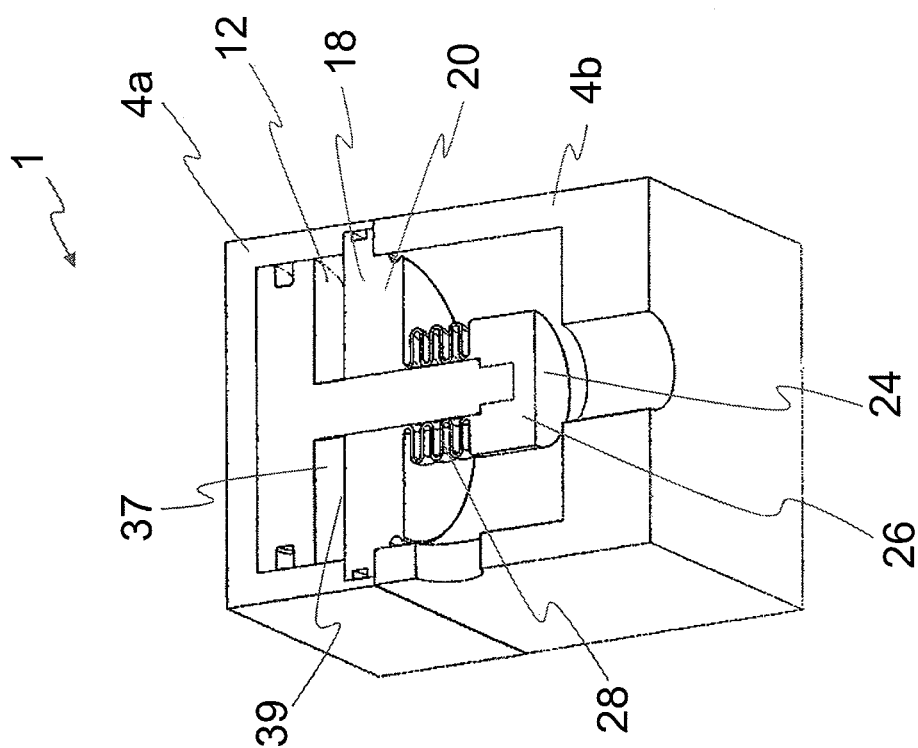
FIG. 4b is a three-dimensional illustration of a blow valve in a closed state according to an embodiment of inventive concepts.

Three-dimensional illustrations of the blow valves 1 shown in FIGS. 3a and 3b are shown in FIGS. 4a and 4b in a manner corresponding to FIGS. 2a and 2b. In an embodiment, the "dead zone" 13 or the entire region between the underside 37 (shown more clearly in FIG. 2b) of the piston element 16 and the top side 39 of the sealing component 18 is very small, in particular a fraction of the receiving region formed on the top of the piston element 16 for receiving the working gas. In an embodiment, the "dead zone" 13 is connected by way of a line connection (not shown) to the environment or a further device respectively and to be able to exchange a gas, in particular air, by way of the line connection.

A diagrammatic illustration of a blow moulding machine 40 with a blow valve 1 according to an embodiment of inventive concepts is illustrated in FIG. 5a.

A pre-form 50 and a container 52 produced from the pre-form 50 according to an embodiment are shown diagrammatically in FIG. 5b.

A filling assembly 41 with a heating device 42, a blow moulding machine 40 and a filling means 46 according to an embodiment is illustrated diagrammatically in FIG. 5c. In an embodiment, the blow moulding machine 40 has at least one blow valve 1. The pre-forms 50 are conveyed by means of a conveying device 44 from the heating device 42 to the blow moulding machine 40 and from there to a filling means 46. In this case it is possible that the filling means 46 need not be provided, since the filling of the produced containers 46, in particular with foodstuffs, such as beverages, can also be carried out at a different time at a different location.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A blow valve for changing a flow rate of an operating working gas in a gas communication path, the blow valve comprising:
   a blow valve body;
   an environmentally controlled first receiving space constructed and arranged in the blow valve body and having at least one entry opening and at least one exit opening for receiving and conveying gas;
   a second receiving space constructed and arranged in the blow valve body and arranged for guiding a pressure distribution member; and,
   a sealing component configured to substantially prevent an exchange of gas between the first receiving space and the second receiving space, the sealing component arranged between the first receiving space and the second receiving space, wherein the sealing component has a stationary portion that is fixed to the blow valve body and a movable portion arranged for changing the flow rate of gas, and wherein the pressure distribution member is at least partially surrounded by the sealing component and is coupled to the movable portion so that the movable portion and the pressure distribution member move together, wherein the movable portion forms a closure face capable of being brought into contact with at least one of the exit opening and entry opening so as to close the at least one of the exit opening and entry opening, wherein the closure face is formed on a first portion of the movable portion and is fixed to the pressure distribution member, wherein the pressure distribution member is a piston head, wherein a second portion of the movable portion is movable with respect to the piston head and is formed between the first portion of the movable portion and the stationary portion of the sealing component, and wherein the second portion of the movable portion is designed in the manner of a bellows which has at least one fold forming a bend.

2. A blow valve according to claim 1, wherein the pressure distribution member is a piston head.

3. A blow valve according to claim 1, wherein the pressure distribution member comprises an operative face bordering the second receiving space, wherein the operative face has an area of at least about twice that of the closure face.

4. A blow valve according to claim 1, wherein the second movable portion comprises a meander shape.

5. A blow valve according to claim 1, wherein the second movable portion is designed in the manner of a diaphragm.

6. A blow valve according to claim 2, wherein the piston head is movable with a working gas pressure.

7. A blow valve according to claim 6 wherein the piston head is movable with an working gas pressure of at least between about 5 bar to 20 bar.

8. A blow valve according to claim 1, wherein the operating working gas is clean air at a pressure of between about 20 bar to 60 bar.

9. A blow valve according to claim 1, wherein at least a portion of the sealing component comprises a material selected from the group consisting of metal, rubber, and plastics material.

10. A blow valve according to claim 1, wherein the environmentally controlled first receiving space is aseptic.

11. A blow moulding machine for shaping plastics material pre-forms into containers, the blow moulding machine comprising a blow valve according to claim 1.

12. The blow moulding machine according to claim 11, wherein the blow moulding machine and blow valve of the blow moulding machine are arranged and configured to mold bottles.

13. A filling assembly for filling containers, the filling assembly comprising:
   a heating device for heating plastics material pre-forms;
   a blow moulding machine according to claim 11 arranged downstream of the heating device in the conveying direction; and,
   a filling apparatus arranged downstream of the blow moulding machine in the conveying direction.

14. A blow valve according to claim 1, wherein the piston element is movable with a working gas at a pressure of 5 bar to 20 bar.

15. A blow valve according to claim 1, wherein a switching time of the blow valve is between 15 ms and 60 ms.

16. A blow valve according to claim 1, wherein a lower pressure is present in the space between the sealing component and the piston element than in at least one of the first receiving space and the second receiving space.

17. A blow valve according to claim 1, wherein a lower pressure is present in the space between the sealing component and the piston element than in the first receiving space and the second receiving space.

18. A blow valve according to claim 1, wherein the sealing component has two notches, a first notch of the two continuous notches at the second portion of the movable portion and a second notch of the two notches at the stationary portion of the sealing component.

19. A blow valve according to claim 18, wherein the first notch has a bent basic form and the second notch has a straight basic form.

* * * * *